May 11, 1954     L. W. BIRBAUM     2,678,119

CENTRIFUGAL CLUTCH

Filed May 5, 1950

INVENTOR.
LESTER W. BIRBAUM
BY
John W. Michael
ATTORNEY

Patented May 11, 1954

2,678,119

UNITED STATES PATENT OFFICE 2,678,119

CENTRIFUGAL CLUTCH

Lester W. Birbaum, Oconomowoc, Wis., assignor to La Belle Industries, Inc., Oconomowoc, Wis., a corporation of Wisconsin Application May 5, 1950, Serial No. 160,307

2 Claims. (Cl. 192—105)

This invention relates to speed responsive clutches, particularly those of the type having a plurality of balls movable in a radial direction under influence of centrifugal force to move a driven clutch plate into driving engagement with a friction disc and the output side of the clutch.

An object of this invention is to provide a simple, reliable clutch of the type described.

Another object of this invention is to make clutches of the type described economically practical by reducing the cost of construction.

Another object is to greatly simplify the construction of clutches of the type described.

Still another object is to provide a clutch of the type described which is extremely versatile in design and may be readily adapted to fit various requirements with slight changes in details.

A further object is to reduce the number of parts required in the clutch of the type described and to make such parts adaptable for low cost fabrication.

A still further object is to provide a clutch of the type described in which the machining operations are held to a minimum.

Still another object is to provide the clutch of the type described wherein the need for hardened clutch plates is eliminated, thus saving costly machining of hardened parts to eliminate warpage encountered in hardening.

Other objects and advantages will be pointed out in, or be apparent from, the specification and claims, as will obvious modifications of the single embodiment shown in the drawings, in which:

Figure 1:
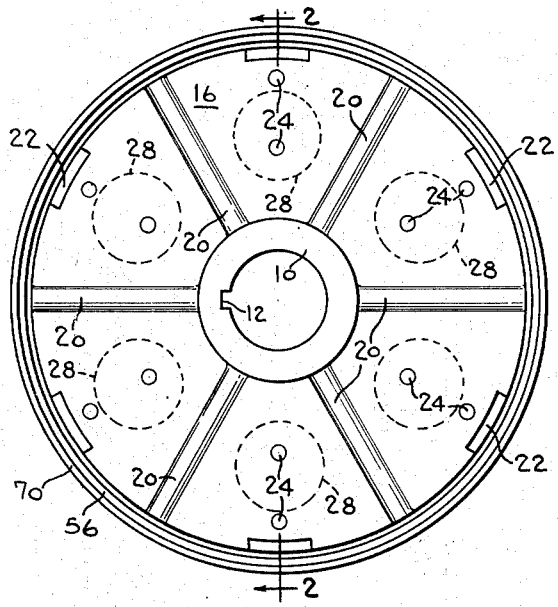
Fig. 1 is an end elevation of the driving end of the clutch.
Figure 2:
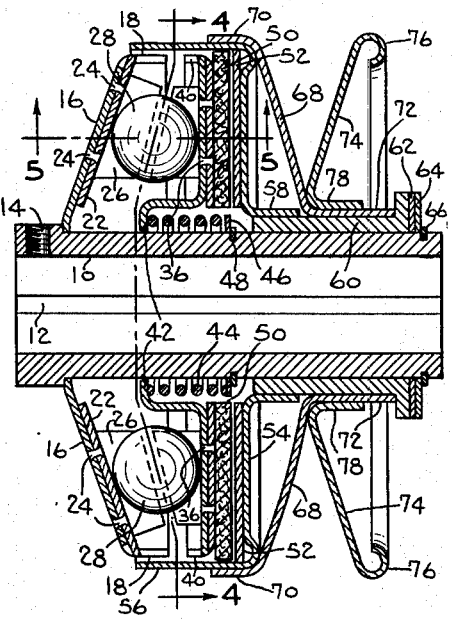
Fig. 2 is a vertical section through the clutch.
Figure 3:
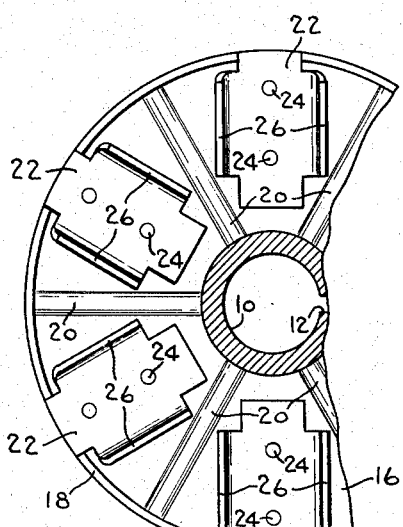
Fig. 3 is a fragmentary elevation of the face of the driving clutch plate.
Figure 4:
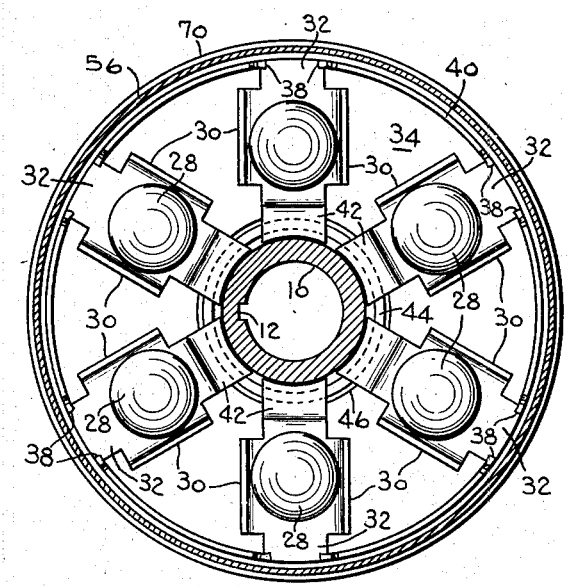
Figure 5:
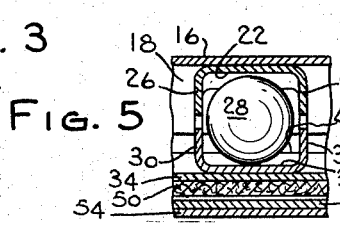

Figs. 4 and 5 are sections taken as indicated by lines 4—4 and 5—5 in Fig. 2.

Referring to the drawings in detail, the clutch is mounted on journal 10 which is provided with keyway 12 and screw-hole 14 permitting connection to a motor or engine shaft by either the key and slot or a set screw. Radially ribbed frusto-conical driving plate 16 is welded or brazed to journal 10 and includes a peripheral flange 18 for a purpose which will appear hereinafter. Radial ribs 20 serve to stiffen the plate to prevent warpage in use. A plurality of hardened steel channels 22 are connected to driving plate 16 by means of rivets 24, 24. Edges 26 of channels 22 serve to engage and confine ball bearings 28 in a radial path as they are thrown outwardly under the influence of centrifugal force. Ball bearings 28 are similarly engaged by edges 30 of hardened channels 32 mounted on driven clutch plate 34 by means of rivets 36 and ears 38 struck from clutch plate flange 40 on each side of the cut-out portion receiving the outer ends of channels 32.

The inner end of each of channels 32 is provided with formed tongue 42 cooperating with journal 10 to center the driven clutch plate 34 with respect to the journal. Tongue 42 also serves as a seat or resting surface for balls 28 when the clutch is at rest and gravity moves the balls toward the journal. A further function of tongues 42 is to serve as an annular seat for spring 44 compressed between the tongues and washer 46 which is held in place by retaining ring 48 in journal 10. It will be noted that compressed spring 44 exerts a force opposing the radial movement of balls 28 under influence of gravity. Thus the strength of spring 44 determines the speed at which the clutch will engage, assuming all other factors, such as the size of the balls, to be constant.

As centrifugal force moves balls 28 outwardly against the force of spring 44, driven clutch plate 34 is moved away from driving clutch plate 16 (to the right in Fig. 2) to force floating friction disc 50 against facing plate 52 carried on clutch housing 54 to transmit the driving force to the housing. As will be appreciated more fully hereinafter, facing plate 52 on the housing could be eliminated if necessary but is preferable to insure a true surface.

Housing 54 includes flange 56 which covers the space between the peripheries of the driving and driven plate for the sake of safety and appearance. Housing 54 also includes sleeve portion 58 which is rotatably mounted on bearing 60 floatingly carried by journal 10 and retained in position by means of hardened washer 62, spacer washer 64, and retaining ring 66. A generally frusto-conical shell 68, including peripheral flange 70 and hub 72, is welded to housing flange 56 for rotation on bearing 60 and serves to stiffen the housing assembly. Housing shell 68 additionally serves as one side of a V-belt sheave. The other side of the V-belt sheave comprises frusto-conical plate 74 having a rolled peripheral edge 76 and an internal sleeve portion 78 adapted to be welded to sleeve 72 of housing shell 68. This design permits of ready modification since the lateral spacing between shell 68 and plate 74 may be varied prior to welding the plate to the shell sleeve to provide for various sheave pitch diameters.

The use of the hardened steel channels on the driving and driven plates avoids the necessity of hardening the plates per se which almost invariably results in warpage requiring costly grinding to bring the plates back to the true shape necessary to achieve a satisfactory drive. The channels eliminate the necessity of forming the driving and driven plates to engage the ball bearings. A further advantage lies in being able to provide for different size ball bearings by merely changing the channel size. Thus different size ball bearings may be employed to vary the characteristics of the drive as will be pointed out more fully hereinafter.

The formed tongues on the driven clutch plate channels serve three functions: (1) as a seat for the balls when the clutch is at rest; (2) as a seat for spring compressed between the tongue and the washer 46 fixed on the journal 10; and (3) as a means journalling the clutch plate on the journal 10. This construction also makes possible the use of the simple spring arrangement which results in great economy of manufacture and lends itself to accurate determination of the engaging speed of the clutch.

As indicated above, the size of the ball bearings may be varied to change the characteristics of the drive. Thus smaller ball bearings will result in the clutch engaging at higher speeds. Of course, the spring rate of spring 44 may also be increased to increase the engaging speed. A higher engaging speed may also be obtained by using fewer ball bearings in combination with a heavier spring or with the same spring. It also follows that the use of heavier or larger balls will result in a lower engaging speed as will the use of a light spring rate. Thus it will be appreciated that the adaptability of this construction to accommodate various springs and various sized balls makes it possible to achieve an almost unlimited number of variations in the operating characteristics.

The use of the hardened steel channels prevents galling or indentation of the clutch plates by the balls as would happen if the surfaces were not hardened. This also makes it possible to use a softer steel for the clutch plates thus avoiding brittleness and difficult machining characteristics. The flanges 18 and 40 on the driving and driven plates serve to limit outward movement of the balls as well as strengthening the plates.

It is to be noted that the clutch housing is comprised of small parts made by the stamping or stamping and extrusion processes. The parts are light weight and are so combined as to give extremely high strength. The simplicity of design is carried out by employing the housing shell 68 as one side of the V-belt sheave. The other side of the sheave is simply formed by a frusto-conical plate 74 which is mounted on the housing shell 68 and may be spaced laterally from the shell at various distances to provide for any desired sheave pitch diameter.

Although but one embodiment of the present invention has been illustrated and described, it will be apparent to those skilled in the art that various changes and modifications may be made therein without departing from the spirit of the invention or from the scope of the appended claims.

I claim:

1. A speed responsive clutch comprising, in combination, an input shaft, a frusto-conical driving plate secured to said shaft, a clutch housing rotatable on said shaft, a driven plate on said shaft and being axially movable on the shaft, a friction disc between said driven plate and said housing, a plurality of balls between said plates, hardened channels mounted on said plates in opposed relation for engaging each of said balls and confining ball movement to a transverse path relative to the axes of the plates, the channels on said driven plate including formed tongues at their inner ends, said tongues including portions lying generally parallel to the shaft and acting as seats for said balls when the shaft is stationary and inwardly directed terminal portions centering the plate on said shaft, an annular seat on said shaft, and a spring coiled around the shaft and compressed between said annular seat and the inwardly directed terminal portions of said tongues to oppose the action of centrifugal force on said balls, rotation of the shaft and driving plate at a predetermined speed being operative to throw the balls outwardly against the force of said spring to cause the driven plate to drive the housing through the friction disc.

2. A speed responsive clutch comprising, in combination, a journal, a driving plate secured to said journal, a driven plate mounted on said journal, said driving plate being generally frusto-conical whereby to define with said driven plate an outwardly converging space between the plates, a plurality of balls between said plates adapted to be thrown outwardly by centrifugal force to force the driven plate away from the driving plate, means defining channels on each of said plates arranged in opposed relation for engaging said balls and for confining the movement of said balls to a transverse path relative to the axes of the plates, a bearing on said journal, a clutch housing rotatable on said bearing, and having an annular flange periferally surrounding the driving and driven plates, a friction disc between said driven plate and said housing for transmitting driving force to the housing when said driven plate is forced away from said driving plate, said housing including a generally frusto-conical stiffening wall having a sleeve portion rotatable on said bearing, a generally frusto-conical member mounted on said sleeve portion and cooperating with said wall to define a V-belt sheave, the lateral spacing between said frusto-conical plate and said wall determining the pitch diameter of the sheave.

References Cited in the file of this patent

UNITED STATES PATENTS

| Number | Name | Date |
|---|---|---|
| 1,714,748 | Wright | May 28, 1929 |
| 1,766,227 | Russell | June 24, 1930 |
| 1,859,334 | Karle | May 24, 1932 |
| 1,883,872 | Bradford | Oct. 25, 1932 |
| 1,981,823 | Cotterman | Nov. 20, 1934 |
| 2,012,509 | Hoddy | Apr. 27, 1935 |

FOREIGN PATENTS

| Number | Country | Date |
|---|---|---|
| 182,113 | Switzerland | Jan. 31, 1936 |
| 510,360 | France | Dec. 3, 1920 |